United States Patent [19]

Takagi et al.

[11] Patent Number: 4,673,838
[45] Date of Patent: Jun. 16, 1987

[54] BRUSH HOLDING DEVICE FOR ROTATING ELECTRICAL MACHINES

[75] Inventors: Yoshito Takagi, Toyohashi; Yasuyuki Wakahara; Satoru Hamano, both of Kariya; Masanori Mori; Masayuki Hamaguchi, both of Okazaki; Naoki Yoshikawa, Nagoya, all of Japan

[73] Assignee: Nippondenso Co., Ltd., Kariya, Japan

[21] Appl. No.: 783,073

[22] Filed: Oct. 2, 1985

[30] Foreign Application Priority Data

Oct. 3, 1984 [JP] Japan .................. 59-208755

[51] Int. Cl.$^4$ ........................... H02K 13/00
[52] U.S. Cl. .................... 310/239; 310/42; 310/43; 310/45; 310/89
[58] Field of Search .......... 310/43, 45, 238, 239, 310/89, 41, 241, 242, 245, 246, 247

[56] References Cited

U.S. PATENT DOCUMENTS

| | | | |
|---|---|---|---|
| 3,739,205 | 6/1973 | Winkelmann | 310/42 |
| 3,794,869 | 2/1974 | Apostoleris | |
| 4,406,963 | 9/1983 | Wolf | 310/239 |
| 4,414,481 | 11/1983 | de Jong | 310/42 |
| 4,475,053 | 10/1984 | Mayer | 310/42 |
| 4,498,230 | 2/1985 | Harris | 310/242 |
| 4,513,214 | 4/1985 | Dieringer | 310/89 |

FOREIGN PATENT DOCUMENTS 2037993  5/1971  Fed. Rep. of Germany .
59-15237  5/1984  Japan .

Primary Examiner—R. Skudy
Attorney, Agent, or Firm—Cushman, Darby & Cushman

[57] ABSTRACT

A brush holding device of an "easy-to-assemble" type disposed between a yoke and an end frame of a motor. The device has a brush holder formed in one body from an electrically insulating material to include an annular-type field winding fixing frame, a brush holding stay having a plurality of brush chambers thereon, each of the brush chambers having at least an opening on the side of the end frame, integral connecting portions annularly connecting the spaced brush chambers therebetween, an insulating plate member having relatively rigid body portions to cover the openings of the brush chambers and relatively flexible portions connecting the body portions therebetween, and means for fixing the insulation to the brush holders by deforming the flexible portions of the insulator toward the brush holders. The aforementioned annular fixing frame has a plurality of flanges radially outwardly extending from the outer periphery thereof by which the annular frame is circumferentially axially aligned with the yoke. Consequently, the brush holding device is able to be rigidly held between the yoke and the end frame without using a bolt while establishing a good alignment of the device in the circumferential and the axial direction.

6 Claims, 20 Drawing Figures

BRUSH HOLDING DEVICE FOR ROTATING ELECTRICAL MACHINES

FIELD OF THE INVENTION

The invention relates to a brush holding device, and in particular, to a brush holding device for rotating electrical machines, which is suitable for use in a starter motor for a motor vehicle.

DESCRIPTION OF THE PRIOR ART

A brush-holding device is already known as disclosed by a Japanese published utility model application No. 59-15237, in which a brush holding stay has at least a pair of opposing brush holders each of which has openings both in the radial direction with respect to the axial center and at the base portion thereof and a concave portion around the base opening portion, and holder pieces inserted into the concave portion, covering the base opening of the brush holder. It is easy to manufacture the brush holding stays of this known brush-holding device because the construction of a molding die apparatus is simple.

However, the abovementioned known construction can not be easily assembled because each holder piece inserted into the concave base opening must be held tightly between the brush holding stay and an end frame to blockade the base opening. In addition, the prior art has another disadvantage that both the holder piece and the corresponding base opening must to be precision diamensioned in order to achieve a good fit therebetween, resulting in a relatively expensive brush holding device.

SUMMARY OF THE INVENTION

In its broadest aspects, it is the primary object of the present invention to provide a brush holding device, in which brockading the openings of brush holders can be easily effected.

This, and other objects are achieved by providing a new structural configuration for a brush holding device. The brush holding device is disposed between a yoke and an end frame of a motor. The brush holding device comprises a ring-like resin frame for fixing field windings, which is secured to the edge of the yoke, and a brush holding stay being made of resin and having a plurality of brush holders each of which has an opening in the axial direction and a connecting portion integrally connecting those brush holding portions to each other. The brush holding stay is rigidly attached to the aforementioned fixing frame. A plate-type insulator having a plurality of body portions caps or blockade the openings of the brush holders and flexible portions integrally connecting those body portions therebetween. Support members hold the insulator at the brush holding stay by deforming the flexible portions. In such an arrangement, there is no need for the above brush holding device a special care when assembling because the insulator can be easily, rigidly attached to the brush holding stay to cover its openings by deforming the flexible portions under pressure.

If, in addition, the frame for fixing field-windings and the brush holding stay are formed integrally, assembling such an integral component to a yoke of a motor is more simplified and the number of parts is reduced.

BRIEF DESCRIPTION OF THE DRAWINGS

The above and further objects and features of the present invention will now become more apparent by reference to the following detailed description and annexed drawings of preferred embodiments of this invention in which.

DESCRIPTION OF PREFERRED EMBODIMENT

Figure 1A:
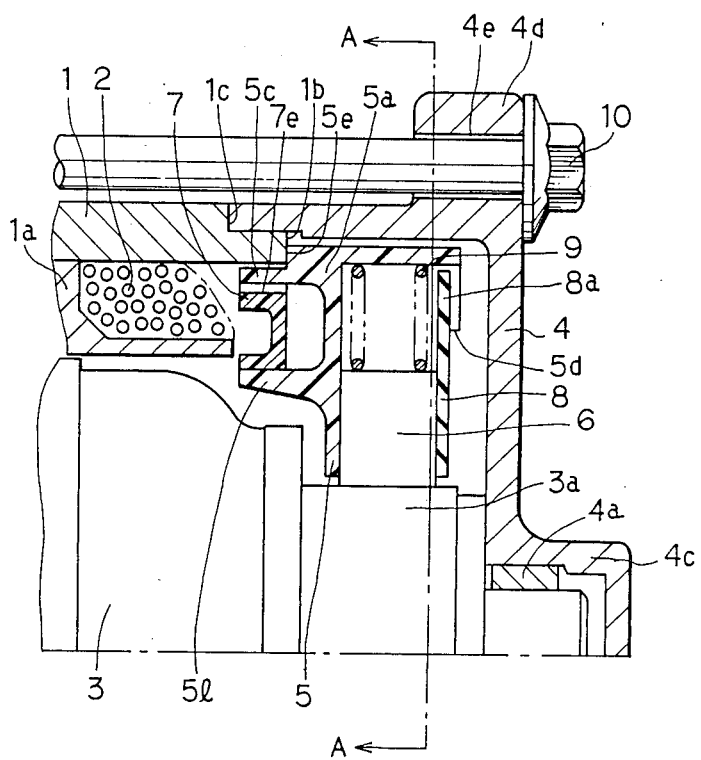
FIG. 1A is a vertical sectional view showing an important part of a first embodiment of a brush holding device according to the present invention, which is disposed between a yoke and an end frame.
Figure 1B:
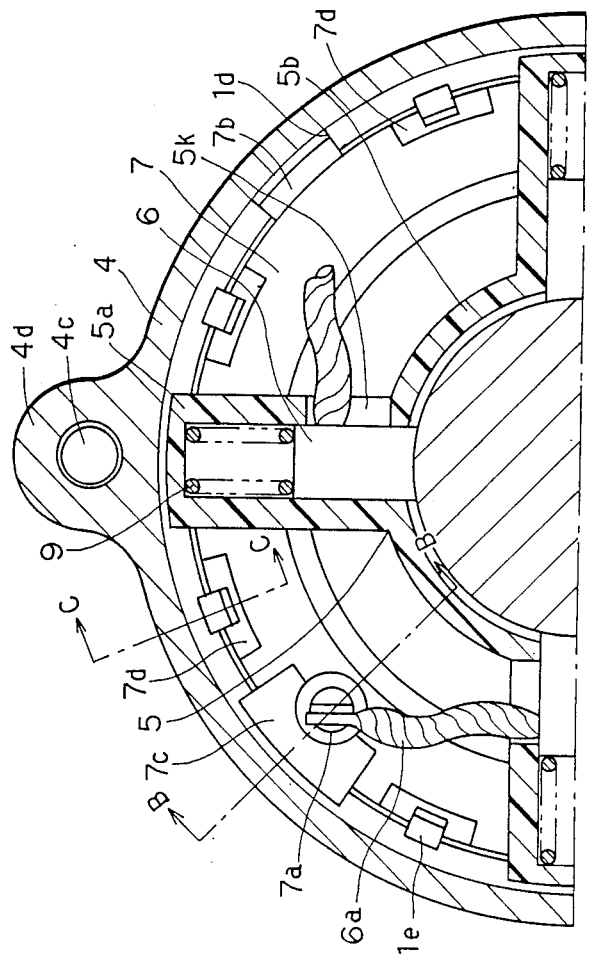
FIG. 1B is a sectional view taken substanially along line A—A of FIG. 1A.
Figure 1C:
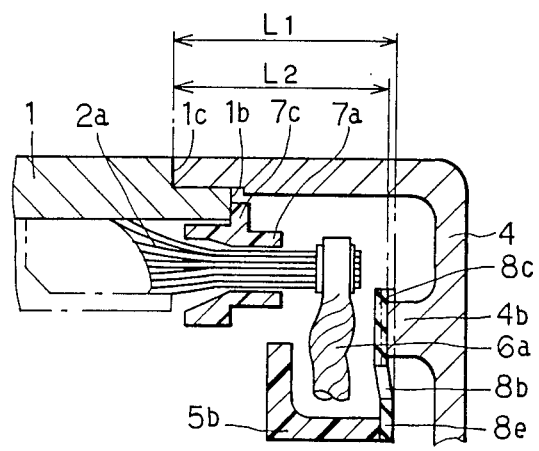
FIG. 1C and FIG. 1D are sectional view taken along the planes B—B and C—C of FIG. 1B.

In the first embodiment from FIGS. 1A to 1D, a cylindrical yoke 1 of a starter motor has a plurality of magnetic pole cores 1a provided on the inner periphery of the yoke 1 and field windings 2 are wound on the magnetic pole cores 1a. The yoke 1 at the opening end has a peripheral shoulder portion, formed with 1b and 1c. An armature 3 at one end having a cylindrical commutator 3a is disposed in the inner peripheral side of the magnetic pole cores 1a. The armature 3 is rotatably supported by a bearing 4a at retainer portion 4c of an end frame 4 having an inner wall (not identified in the drawings) and having a peripheral opening at one end to be held on the yoke 1. The end frame 4 has four projections 4b spaced equally in the circumferential direction which are at substantially the same radial distance from the center of the end frame 4 while being formed with attachment eyes 4d having attachment bores 4e therein on its outer periphery.

Figure 2:
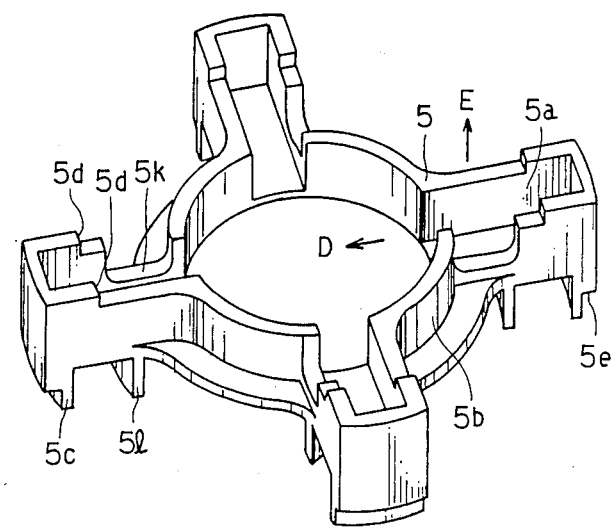
FIG. 2 is a perspective side view of the brush holding stay of the first embodiment.
Figure 3:
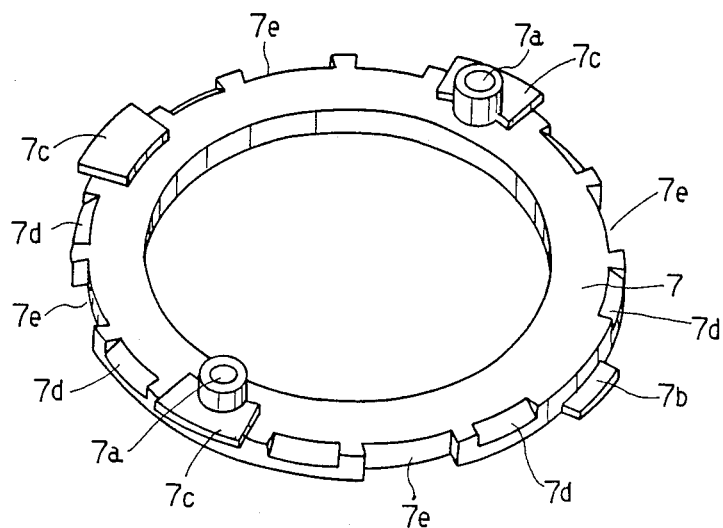
FIG. 3 is a perspective side view of a ring-type resin frame for fixing the field windings.
Figure 4:
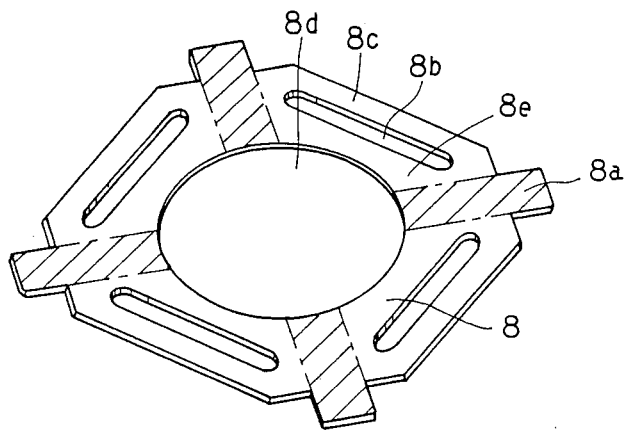
FIG. 4 is a perspective side view of an insulator used in the first embodiment.

A brush holding stay 5, as shown in FIG. 2, is made as a plastic injection molding, integrally formed with four brush holders 5a in which brushes 6 are movably received, and with connecting portions 5b circumferentially connecting the inner circumferential side of each brush holder 5a. Within the peripheral wall of the connecting portions 5b is exactly mounted the commutator 3a. Each brush holder 5a has openings both in direction of arrow D(communitator side) and also the direction of slide of the brush 6, and in direction of arrow E(end frame side). The end frame side opening of each brush holder 5a has shoulders 5d at an outer periphery side and a concave portion 5k at an inner periphery side. At the opposite side of the end frame side opening or at the base of the brush holder 5a there are also integrally formed with axially extending parallel tongues 5c and 5l for an alignment purpose, while further forming a shoulder 5e between the end wall of each brush holder 5a and the tonque 5c. A ring-type fixing frame 7 for fixing field windings, as best illustrated in FIG. 3, is made as a plastic injection molding, having a concave cross-section for improved mechanical strength, formed with two alignment holes 7a through which terminating wires 2a of the field windings wound on the magnetic pole cores 1a extend from the core side to the end frame side. The fixing frame 7 also has at the outermost periphery a radially outwardly extending flange 7b to be aligned with the yoke(while having other flanges 7c extending outwardly in the radial direction in order to restrict the axial movement thereof. The fixing frame 7, in addition, has at the edge of the outer periphery a plurality of tapered sections 7d and a plurality of recessions 7e on the side of the end frame 7. The recessed sections 7e are located on a smaller diameter. An insulator 8 is made of insulation material, being substantially of an octagon shape, having a center hole 8d therein into which the commutator 3a is inserted. As seen in FIG. 4, the plate-type insulator 8 is provided with four body portions 8a(shadowed portions) for capping or blockading the corresponding openings of the brush holders 5a, and flexible portions 8e integrally connecting those body portions 8a, 5a therebetween. The flexible portions 8e are provided with circumferentially spaced slots 8b, as viewed in FIG. 4, thereby forming beam portions 8c. A brush spring 9 is disposed between an end wall of each brush holder 5a and the each brush 6 and urges one end of the brush 6 into resilient sliding contact with the commutator 3a. After having assembled various parts shown in FIG. 1A, the end frame 4 is secured to another frame(not illustrated for clarity) of the motor to hold the yoke 1 tight therebetween by means of a bolt 10 which is received in the bore 4e.

Figure 1D:
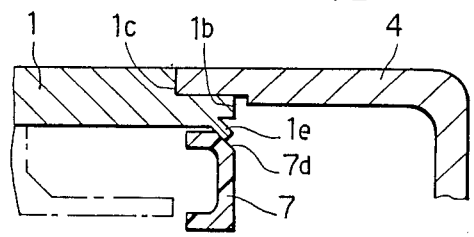

When assembling the above-described various parts, as best understood in FIG'S. 1A-1C, first, passing the terminating wires 2a of the field windings 2 wound on the magnetic pole cores 1a through the holes 7a of the plastic ring-like frame 7 and electrically connecting those wires 2a with pig tails 6a of brushes 6, in suitable connections not shown, and standard in the art. Second, the alignment of the frame 7 is circumferential in which the radially extending flange 7b is fitted into a cut portion 1d provided in the inner circumferential shoulder 1b of the yoke 1. This construction permits mounting of the frame 7 in place in the circumferential direction while preventing the axial movement of the frame 7 with flanges 7c abutting against the inner circumferential shoulder 1b of the yoke 1. At this time, the frame 7 is rigidly attached to the yoke 1 as seen in FIG. 1D by means of crimped split portions 1e. Thereafter, as viewed in FIG. 1A, inserting the axial tongues 5c respectively into the recessions 7e, thereby locating in the exact place for assembling from such insertion workings as well as the shoulders 5e abutting against the inner circumferential shoulder 1b of the yoke 1. The other tongues 5l are used as guides, so that during assembly the brush holding stay 5 may be easily introduced into the frame 7. Then, the brushes 6 connected to the pig tails 6a are respectively inserted into the brush holders 5a in such a manner that as the end walls of the brush holders 5a function as the spring seat walls, the brush springs 9 respectively urge one end of the brushes 6 into resilient sliding contact with the commutator 3a. The concave portions 5k can accomodate themselves to the relatively free movement in the radial direction of the pig tail 6a passing therethrough. Next, capping the opening sides of the brush holders 5a in such a manner that the body portions 8a (shadowed portions) are positioned just above the openings of the brush holders 5a while the other portions(flexible portions) bridging therebetween. The insulator 8 can be easily aligned with the brush holding stay 5 in the circumferential direction by inserting the radially, extending projections 8a into the openings 5a. The shoulders 5d and the thickness of the insulator 8 are arranged so that the insulator 8 is inserted flush with or below top surfaces of the openings 5a. Thereafter, the end frame 4 is to be held on the yoke 1 to achieve a good fit between mating surfaces of the opening edge of the end frame 4 and the outer circumferential shoulder 1c of the yoke 1 while supporting for rotation the armature shaft by the bearing 4a at 4c. The projections 4b are provided in the end frame 4 such that they, during and after assembling exerts forces to push and hold the insulator 8 against the brush holding stay 5 by deforming, toward the end frame side the flexible beam portions 8c. This holding effects may be achieved by having distance L1 between 1c and the surface of the insulator 8, being larger than distance L2 between 1c and the surface of the projection 4b as viewed in FIG. 1c. Therefore, with the various parts of FIG. 1c having dimensions described above, fixing the end frame 4 to the yoke 1 by means of the bolt 10 will cause the projections 4b to push the flexible portions 8c of the insulator 8 toward the yoke side, thus rigidly supporting the brush holding stay 5 between the yoke 1 and the end frame 4. In this invention, the brush holding stay 5 has an "easy to mold" configuration suitable for mass-productions with very low manufacturing cost. It is an advantage of the invention that the brush holding stay 5 can be rigidly held between the yoke 1 and the end frame 4 by the insulator 8 without using a screw or a bolt even when the brush holding stay 5 and the insulator 8 both have relatively rough dimensions each other. The connecting portions 5b are advantageously provided for preventing the pig tails 6a from electrically contacting the commutator 3a as well as to preclude possible deformation when assembled of the brush holding stay 5. The circumferential walls of the connecting portions 5b may avoid despersion of the brush worn pieces within the motor housing.

Figure 5:
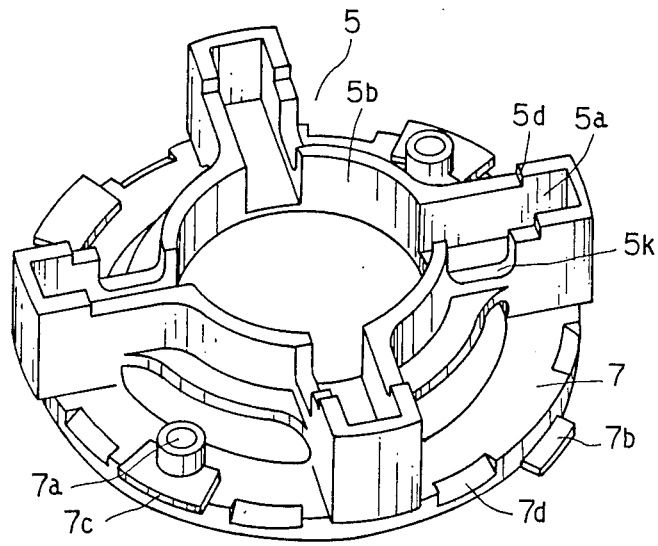
FIG. 5 is a perspective side view of the brush holding stay, illustrating the invention in a second embodiment.
Figure 6:
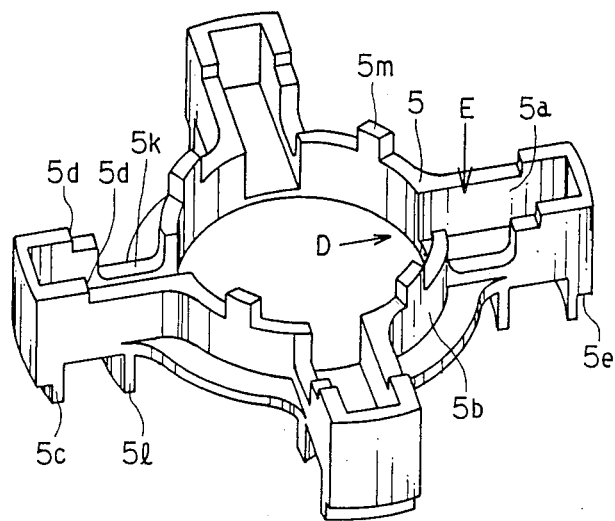
FIG. 6 and FIG. 7 respectively show perspective side views of the brush holding stay and the insulator of the third embodiment.
Figure 7:
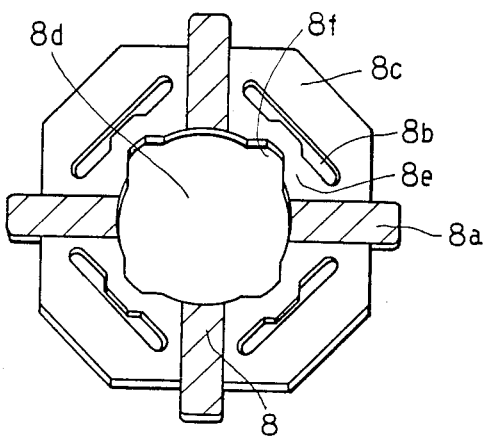

In a second exemplary embodiment of the invention according to FIG. 5, the brush holding stay 5 having the brush holders 5a and the connecting portions 5b and the fixing frame 7 is integrally made as a plastic injection molding instead of preparing those components separately, thus resulting in the simplification of the assembling with less number of the parts. The integral brush holding stay 5 of the second embodiment has the connecting portions 5b, however, it may be modified to have only the frame portions 7 for fixidly connecting the brush holders 5a thereby. In a third embodiment the brush holding stay 5 and the insulator 8 may be little modified to be shown respectively in FIG. 6 and FIG. 7, in which the brush holding stay 5 has projections 5m on the connecting portions 5b as shown in FIG. 6 and the insulator 8 has depressions 8f on its inner periphery so that when assembling the insulator 8 is easily aligned with the brush holding stay 5 by fitting the projections 5m respectively in the depressions 8f.

Figure 8:
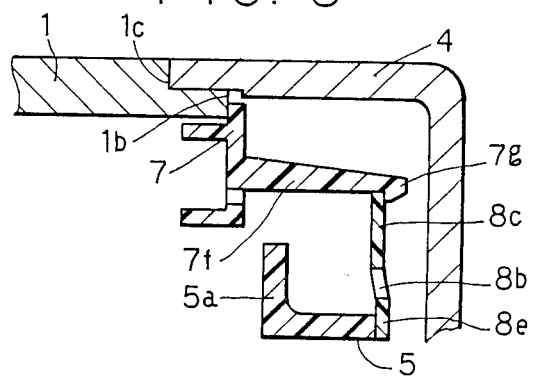
FIG. 8 is a sectional view showing an important part of a fourth embodiment in a different construction of the invention than that shown in FIG. 1C.

In a fourth embodiment shown and best understood from FIG. 8, the projection 4b is here constructed by a part of the body of the frame 7, in which the fixing frame 7 has axially extending portions 7f at whose forward end there are provided hooking portions 7g, thereby hooking the insulator 8 at 8c(flexible beam portion) toward the frame 7 in order to tightly hold the brush holdering stay 5 between the frame 7 and the insulator 8.

Figure 9A:
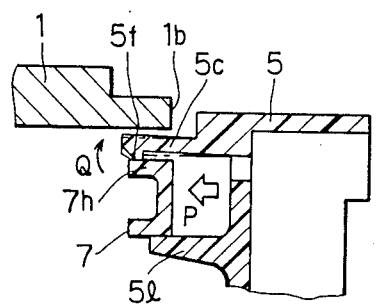
FIG. 9A and FIG. 9B are sectional views illustrating an assembling of the brush holding stay and the abovementioned field windings fixing frame in a fifth embodiment.
Figure 9B:
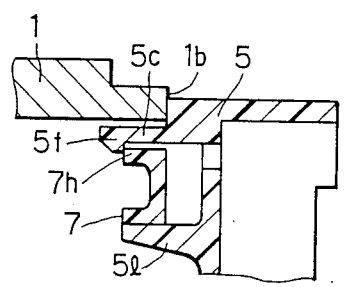

In a fifth embodiment shown and understood from FIGS. 9A and 9B, the tongue 5c has at its forward end a projection 5f, so that this embodiment has a great advantage that by employing such projection 5f the alignment of the brush holding stay 5 in the circumferential and axial direction may be easily achieved only by inserting the tongue 5c into the recessed section 7e until its projection 5f catches the frame 7 by the edge 7h.

Figure 10A:
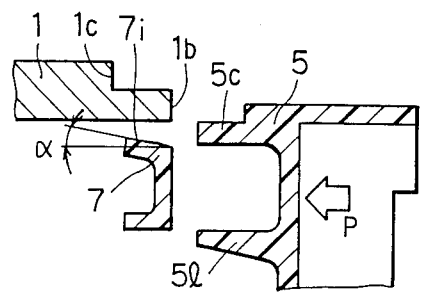
FIG. 10A, FIG. 10B and FIG. 10C respectively show sectional views and a perspective side view in part, showing an important part of a sixth embodiment.
Figure 10B:
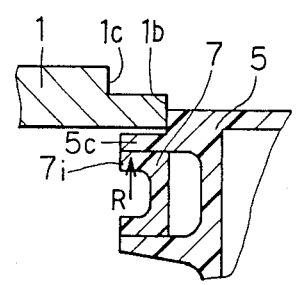
Figure 10C:
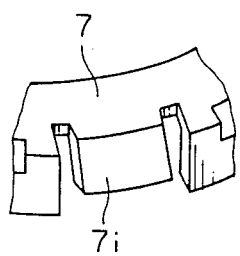

In a sixth embodiment shown in FIGS. 10A, 10B and 10C, one or more of the recessed sections 7e is modified to have a sloped edge portion 7i as viewed in FIG. 10c, capable of being deformed when inserting the tongue 5c in direction of the arrow P in the manner mentioned above. In this arrangement, the force generated by insertion workings in direction of the arrow R can also prevent the movement of the brush holding stay 5 in the axial direction. For attaining such fixing effects by the sloped edge portion 7i, the edge portion 7i with 5° to 10° tilt may be sufficient with respect to the insertion direction. Of course, instead of providing such flexible sloped portion 7i in the frame 7, the tongue 5c may be sloped inwardly to gain the same effects.

Figure 11A:
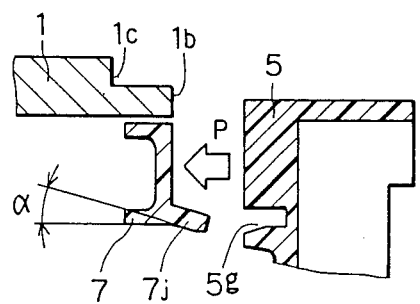
FIG. 11A and FIG. 11B respectively show sectional views showing an important part of a seventh embodiment.
Figure 11B:
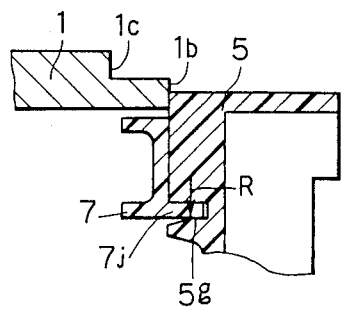

In a seventh embodiment shown in FIGS. 11A and 11B, the fixing frame 7 has projections 7j inclined (α°) with respect to the axis of the armature shaft. On the other hand, there are provided grooves 5g into which the inclined projections 7j are received, respectively. The angled edge surface of the grooves 5g may provide for easier insertion. This embodiment, too, in the same manner as in the sixth embodiment, can rigidly fix the brush holding stay 5 by utilizing the force generated in direction of the arrow R. Accordingly, the alignment of the brush holding stay 5 can be easily attained.

Figure 12:
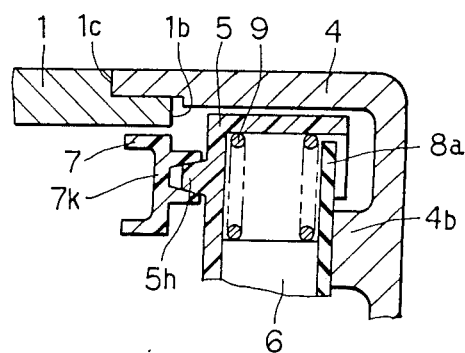
FIG. 12 is a sectional view illustrating similar parts of FIG. 11, but showing an eighth embodiment.
Figure 13:
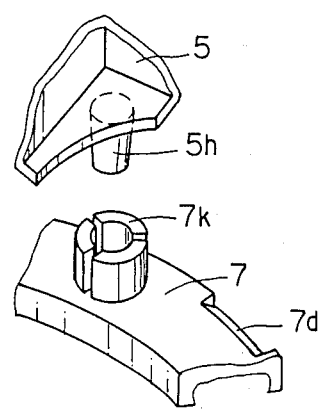
FIG. 13 is a perspective side view of assembling the brush holder and the field winding fixing frame of FIG. 12.

In an eighth embodiment shown in FIGS. 12 and 13, a cylindrical tapered surface portion 5h extending from the base portion of each brush holder 5a is press-fitted into the interior of a cylindrical member 7k with at least one slit in the curved surface, which has similar, tapered circumferential inner walls which are engageable with the portions 5h of the same shape to secure the connection therebetween for the alignment in the circumferential and axial directions.

What we claim is:

1. A brush holding device for holding brushes in sliding contact with a commutator of a motor, and disposed between a yoke and an end frame of said motor, comprising:
   an annular fixing frame formed as an integral body from an electrically insulating material to have a plurality of flanges radially outwardly extending from an outer periphery thereof and depressions provided at the outer periphery thereof;
   a brush holding stay held on said annular fixing frame and formed as an integral body from an electrically insulating material to have a plurality of spaced apart brush holders, each holder having a first opening provided in an inner end thereof to which said commutator faces and a second opening provided in a side surface thereof to which said end frame faces, and connecting portions connecting said brush holders;
   an insulating plate disposed between said brush holding stay and an inner wall of said end frame and integrally formed from an electrically insulating material to have a plurality of relatively rigid portions and a plurality of relatively flexible portions bridging said relatively rigid portions therebetween;
   said relatively rigid portions being disposed so that they blockade said second openings of said brush holders;
   projection means for pushing said relatively flexible portions of said insulating plate toward said brush holding stay, so that said insulating plate is rigidly held on said brush holding stay by resilience of said relatively flexible portions thereof;
   a plurality of brushes reciprocally received in said brush holders respectively;
   spring means for urging said brushes into sliding contact with said commutator; and
   pig tails electrically connected to said brushes
   said annular fixing frame having a plurality of flanges radially, outwardly extending from the outer periphery thereof by which said annular fixing frame is substantially held at an edge of said yoke and is substantially aligned with said yoke;
   each of said brush holders having walls defining a chamber to receive one of said brushes therein, at least one of said walls further having a depression for passing one of said pig tails therethrough.

2. A brush holding device as claimed in claim 1 wherein each of said brush holders has a portion from which a pair of parallel tongues extend so that said brush holding stay can be substantially aligned with said annular fixing frame in the circumferential direction by inserting at least respective ones of said parallelly of extending tongues into the respective depressions of said annular fixing frame.

3. A brush holding device as claimed in claim 2 wherein at least one of said pair of tongues further has at its forward end a projection whereby hooking the respective depression of said annular fixing frame so that said brush holding stay is substantially aligned with said annular frame in the circumferential and axial directions.

4. A brush holding device as claimed in claim 1 wherein said projection means comprises a plurality of spaced projections inwardly projecting from said inner wall of said end frame, said projections corresponding to said relatively flexible portions of said insulating plate, so that said brush holding stay and said insulating plate are rigidly held between said yoke and said end frame by resilience of said relatively flexible portions of said insulating plate.

5. A brush holding device for holding brushes in sliding contact with a commutator of a motor, and disposed between a yoke and an end frame of said motor, comprising:

a brush holding member formed an integral body from an electrically insulating material to have a plurality of spaced apart brush holders, each brush holder having a first opening provided in an inner end thereof to which said commutator faces and a second opening provided in a side surface thereof to which said end frame faces, an annular frame portion supporting said spaced apart brush holders thereon, said annular frame portion having a plurality of flanges radially outwardly extending from an outer periphery thereof, and wall portions connecting said inner ends of said brush holders therebetween;

a corresponding plurality of brushes reciprocally received in said brush holders respectively;

a corresponding plurality of spring means for urging one end of said brushes into sliding contact with said commutator;

a corresponding plurality of pig tails electriclly connected to said brushes;

an insulating plate disposed between said brush holding member and an inner wall of said end frame and formed as an integral body from an electrically insulating material to have relatively rigid portions and relatively flexible portions bridging said relatively rigid portions therebetween;

projection means for pushing said relatively flexible portions of said insulating plate toward said brush holding member;

each of said brush holders having walls defining a chamber to receive one of said brushes, at least one of said walls further having a depression for passing one of said pig tails therethrough;

said rigid portions of said insulating plate being correspondingly arranged for blockading at least said second openings of said brush holders;

said brush holding member and said insulating plate being substantially held between said yoke and said end frame by resilience of said relatively flexible portions of said insulating plate.

6. A brush holding device for holding brushes in sliding contact with a commutator of a motor, and disposed between a yoke and an end frame of said motor, comprising;

a brush holding stay formed as an integral body from an electrically insulating material to have a plurality of spaced apart brush holders, each holder having a first opening provided in an inner end thereof to which said commutator faces and a second opening provided in a side surface thereof to which said end frame faces, and connecting portions connecting said brush holders;

an insulating plate disposed between said brush holding stay and said end frame and formed as an integral body from an electrically insulating material to have a plurality of relatively rigid portions and a plurality of relatively flexible portions bridging said relatively rigid porions therebetween;

said relatively rigid portions being disposed so that they blockade said second openings of said brush holders; and projection means for pushing said relatively flexible portions of said insulating plate toward said brush holding stay, so that said insulating plate is rigidly held on said brush holding stay by resilience of said relatively flexible portions thereof.

* * * * *